United States Patent [19]

Misumi et al.

[11] Patent Number: 4,753,835
[45] Date of Patent: Jun. 28, 1988

[54] FRP PLATE AND PROCESS FOR MANUFACTURING THE SAME

[75] Inventors: Atsushi Misumi; Toshihiro Takehana, both of Yokohama, Japan

[73] Assignee: NHK Spring Co., Ltd., Yokohama, Japan

[21] Appl. No.: 808,823

[22] Filed: Dec. 13, 1985

Related U.S. Application Data

[63] Continuation of Ser. No. 553,705, Nov. 21, 1983, abandoned.

[30] Foreign Application Priority Data

Dec. 2, 1982 [JP] Japan .................. 57-211959

[51] Int. Cl.⁴ ........................... F16F 13/02
[52] U.S. Cl. ........................ 428/74; 428/76; 428/114; 428/288; 267/52
[58] Field of Search ............ 267/52; 428/74, 76, 428/114, 268, 262, 288

[56] References Cited

U.S. PATENT DOCUMENTS

| | | | |
|---|---|---|---|
| 1,958,116 | 5/1934 | Simpson, Jr. et al. | 428/76 |
| 3,142,598 | 7/1964 | Rosen | 156/162 |
| 3,928,693 | 12/1975 | Rudloff | 428/74 |
| 4,598,900 | 6/1984 | Yamamoto et al. | 267/52 |

FOREIGN PATENT DOCUMENTS

| | | |
|---|---|---|
| 635334 | 7/1963 | Belgium . |
| 0005916 | 12/1979 | European Pat. Off. . |
| 0040531 | 11/1981 | European Pat. Off. . |
| 0051245 | 5/1982 | European Pat. Off. ............ 428/74 |
| 0082321 | 6/1983 | European Pat. Off. ............ 428/137 |
| 1065767 | 5/1954 | France . |
| 1241437 | 8/1960 | France . |
| 1503014 | 11/1967 | France . |
| 59-102509 | 7/1984 | Japan . |

OTHER PUBLICATIONS

PATENTS ABSTRACTS OF JAPAN, vol. 3, No. 101 (M-70), Aug. 25, 1979, p. 2 M 70; & JP-A-54 74 057 (TORAY K.K.) 06-13-1979.

*Primary Examiner*—Nancy A. Swisher
*Attorney, Agent, or Firm*—Frishauf, Holtz, Goodman & Woodward

[57] ABSTRACT

An FRP plate spring member having spring characteristics of the invention has a protective layer of a resin formed on the entirety or part of the outer surface of an FRP base comprising a number of reinforcing fibers which are impregnated with and held in a cured matrix resin. A process for manufacturing such an FRP plate includes a step of applying a resin for forming the protective layer on the entirety or part of the inner surface of a mold for molding the FRP plate.

10 Claims, 4 Drawing Sheets

FRP PLATE AND PROCESS FOR MANUFACTURING THE SAME

This is a continuation of application Ser. No. 553,705 filed Nov. 21, 1983, now abandoned.

BACKGROUND OF THE INVENTION

The present invention relates to an FRP (fiber reinforced plastic) plate, i.e., a spring member having spring characteristics which consists of a number of reinforcing fibers which are impregnated with and held in a thermosetting resin, and to a process for manufacturing the same.

An FRP plate is suitable for a laminated or leaf spring since it is light in weight and has high strength and elasticity due to the presence of the reinforcing fibers embedded therein. The direction along which the reinforcing fibers extend and the arrangement of these fibers in an FRP laminated spring are determined in accordance with the type of resin used, the application and operating conditions of the spring. Although an FRP spring has various good properties such as light weight and good corrosion resistance as described above, there is still room for improvement.

First, when the surface of an FRP plate is damaged for some reason or reinforcing fibers are severed at portions close to the surface of the plate due to repeated load, the plate tends to crack or separate in the direction along which the fibers extend. When an FRP plate is subjected to a surface treatment such as polishing or cleaning for adhering another part thereto, portions of reinforcing fibers are often exposed or severed, degrading the strength of teh plate.

Second, the reinforcing fibers of an FRP plate have great tensile strength but easily buckle under a compression force. Accordingly, a laminated spring comprising an FRP plate is weak in the direction along which a compression force acts, and therefore has a poor overall durability.

SUMMARY OF THE INVENTION

It is an object of the present invention to provide an FRP plate which is little damaged by external impact, does not easily crack or cause separation of the reinforcing fibers upon receiving a repeated load, has little buckling due to a compression force, and prevents damage to the reinforcing fibers by a surface treatment such as polishing or cleaning, and to provide a process for manufacturing the same.

In order to achieve the above object, a thermosetting resin of an FRP plate of the present invention consists of a number of reinforcing fibers and the thermosetting resin for impregnating these fibers consists of a cured matrix resin for impregnating and holding the fibers to form an FRP base, a cured resin of a protective layer is adhered to at least part of the outer surface of the FRP base.

A process for manufacturing an FRP plate according to an aspect of the present invention comprises a first step of impregnating a number of reinforcing fibers with a thermosetting resin; a second step of winding the impregnated reinforcing fibers a number of times so as to provide an annular body; a third step of placing the annular body in a mold having a chamber of a predetermined shape and heating and curing the annular body; the fourth step of cutting the annular body which has been heated and cured into portions of a predetermined shape and size, the first to fourth steps constituting a conventional process for manufacturing an FRP plate; and the fifth step of applying a resin on at least one surface of a winding reel of the mold prior to the second step of winding the reinforcing fibers impregnated with the resin around the winding reel, the fifth step being a characteristic feature of the present invention.

According to another aspect of the present invention, the characteristic feature of the process comprises a step of arranging a screen for allowing passage of a resin therethrough in a winding groove of a winding reel of the mold prior to the second step of winding the reinforcing fibers impregnated with the thermosetting resin around the winding reel.

An FRP plate of the present invention is manufactured by the process described above and is protected on part or the entire surface thereof with a protective layer. The part or entire surface of the FRP plate can not be damaged. Even if portions of reinforcing fibers close to the surface of the plate are damaged, cracking or separation in the direction along which the fibers extend is reduced. Even if a surface treatment such as polishing or cleaning of an FRP plate is performed, exposure of portions of the reinforcing fibers to the surface of the plate, severing of the reinforcing fibers, and the resultant decrease in the strength of the plate are prevented. If a protective layer is formed on the surface of the FRP plate on which a compression force acts upon application of a repeated bending force, buckling of reinforcing fibers on such a surface can be suppressed. Thus, the durability of the FRP laminated spring can be improved.

According to the process of the present invention, the matrix resin and the resin of the protective layer can be simultaneously cured. This simplifies the manufacturing process of an FRP plate and lowers the manufacturing cost thereof.

DETAILED DESCRIPTION OF THE PREFERRED EMBODIMENTS

Figure 1:
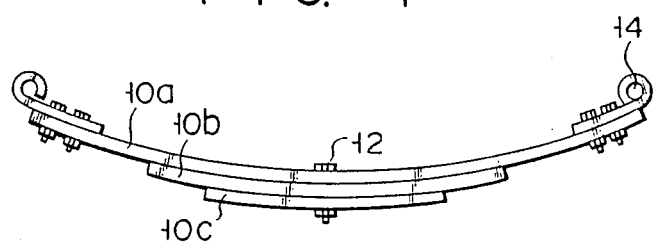
FIG. 1 is a front view of a laminated spring for an automobile using FRP plates.

An embodiment of an FRP plate and a process for manufacturing the same according to the present invention will now be described. FIG. 1 shows a spring device for an automobile suspension as a typical application of an FRP plate of the present invention. The spring device shown in FIG. 1 consists of laminated FRP plates 10a, 10b and 10c, each of which curves downward in a free state. Reference numeral 12 denotes a center bolt for fixing the three FRP plates together, and 14, coupling members for respectively coupling the two ends of the uppermost FRP plate 10a to a chassis of an automobile (not shown).

Figure 2:
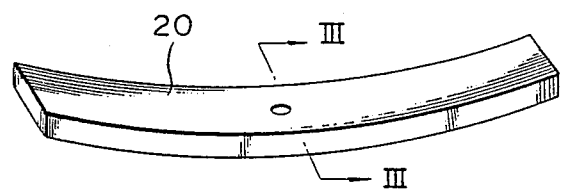
FIG. 2 is a perspective view of a single FRP plate used for the laminated spring shown in FIG. 1.
Figure 3A:
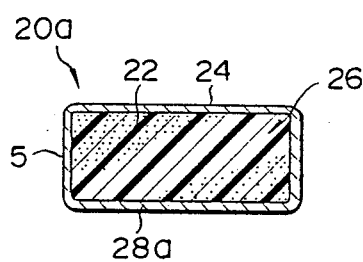
FIG. 3A is a sectional view along the line III—III of the FRP plate shown in FIG. 2 in which a protective layer is formed along its entire outer circumferential surface.
Figure 3B:
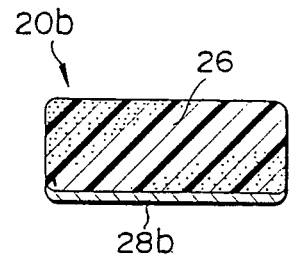
FIG. 3B is a sectional view along the line III—III of the FRP plate shown in FIG. 2 in which a protective layer is formed at part of its outer circumferential surface.

FIG. 2 shows one FRP plate 20 of the FRP plates of the spring device shown in FIG. 1. The FRP plate 20 has a substantially rectangular cross section. The FRP plate 20 can be an FRP plate 20a as shown in FIG. 3A or an FRP plate 20b as shown in FIG. 3B. The FRP plate 20a has, as seen along the line III—III in FIG. 2, an FRP resin base 26 comprising a number of reinforcing fibers 22 which are impregnated with and held in a thermosetting matrix resin to be securely held thereby, and a protective layer 28a also consisting of a thermosetting resin 24 formed around the entire circumferential surface of the base 26. The FRP plate 20b comprises an FRP base 26 with a protective layer 28b formed on only one surface of the base 26.

Reinforcing fibers 22 used for an FRP plate shown in FIG. 2 are generally oriented along the longitudinal direction of the FRP plate and can be glass fibers, polymer fibers such as aramide fibers, carbon fibers or the like. The matrix resin can be a thermosetting resin such as an epoxy resin, an unsaturated polyester resin, or a vinyl ester resin. The material of the protective layer 28a or 28b can be the same as the matrix resin or any other suitable material which protects the surface of the FRP base 26 well. Selection between the use of reinforcing fibers of the same diameter in the FRP base 26 and the use of reinforcing fibers of different diameters at different locations, selection between uniform or nonuniform density of the reinforcing fibers, selection between uniform or nonunform orientation of the reinforcing fibers and other conditions must be determined before an FRP plate is manufactured. These conditions must be determined in accordance with the intended application of the FRP plate to be manufactured. Since these conditions are not directly related to the scope of the present invention, a description thereof will be omitted.

Figure 3C:
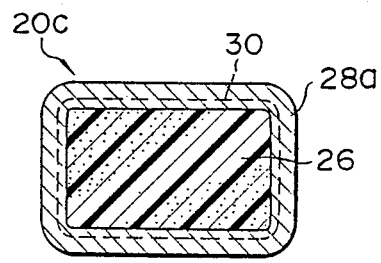
FIGS. 3C and 3D are sectional views along the line III—III of the FRP plate shown in FIG. 2 in which a screen is arranged between an FRP base and a protective layer.
Figure 3D:
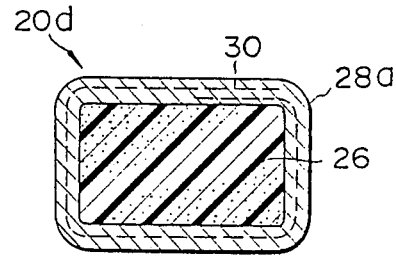

FIGS. 3c and 3d show FRP plates 20c and 20d along the line III—III of FIG. 2, wherein a screen 30 is inserted between the FRP base 26 and the protective layer 28a of the respective FRP plate. The screen 30 is related to a process for manufacturing an FRP plate according to another embodiment of the present invention to be described later and will therefore be described in relation thereto.

In the FRP plate 20a, 20b, 20c or 20d, the outer surface of the FRP base 26 containing the reinforcing fibers 22 is covered with and protected by the protective layer 28a or 28b. Accordingly, even if the plate is subjected to an external impact, the reinforcing fibers 22 tend not to be severed. Even if the reinforcing fibers are severed by an external impact or a repeated load, cracking, separation or buckling of the plate along the fibers is prevented due to the presence of the protective layer 28a or 28b. An accessory part such as a spacer or a washer is generally adhered if the FRP plate is to be used for an FRP spring. Accordingly, even if the plate is subjected to a surface treatment for such adhesion, the reinforcing fibers 22 are not damaged and durability is improved. In a creep test (80° C. for 20 days) in which a bending stress of 60 kgf/mm$^2$ was applied to the FRP plate of the type as shown in FIG. 3A, no defects such as buckling or separation were observed in the direction along which the pulling force was applied or in the direction along which a compression force was applied.

The protective layer 28a or 28b need not be formed along the entire surface of the FRP base 26 depending on the type of the FRP plate and the direction along which the load is to be applied. For example, the protective layer 28b can be formed only on the surface of the FRP base on which the compression force acts when the FRP plate is used as a laminated spring. Then, buckling of the reinforcing fibers near the surface portion on which the compresesion force acts can be prevented and durability can be improved.

In order to obtain the effect as described above, the thickness of the protective layer must fall within the range between 0.1 to 1.0 mm, and generally falls within the range 0.1 to 0.5 mm.

Figure 4:
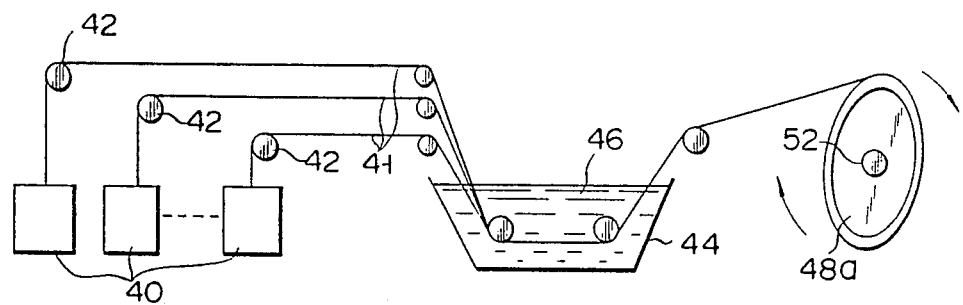
FIG. 4 is a schematic view showing a part of a process and an apparatus for winding reinforcing fibers impregnated with a matrix resin on a winding reel.
Figure 5A:
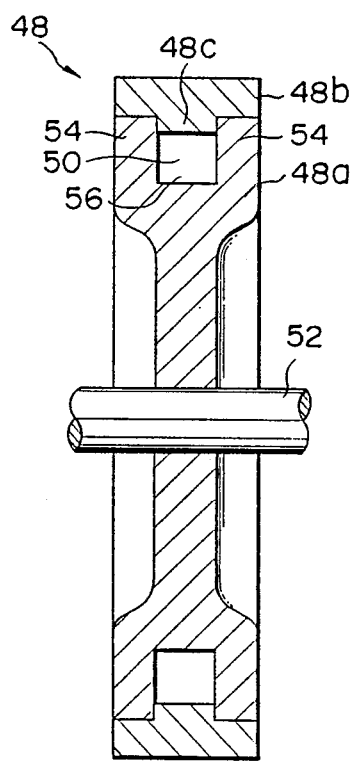
FIGS. 5A and 5B are a side sectional view and a front view, respectively, of a winding reel used in the process shown in FIG. 4.
Figure 5B:
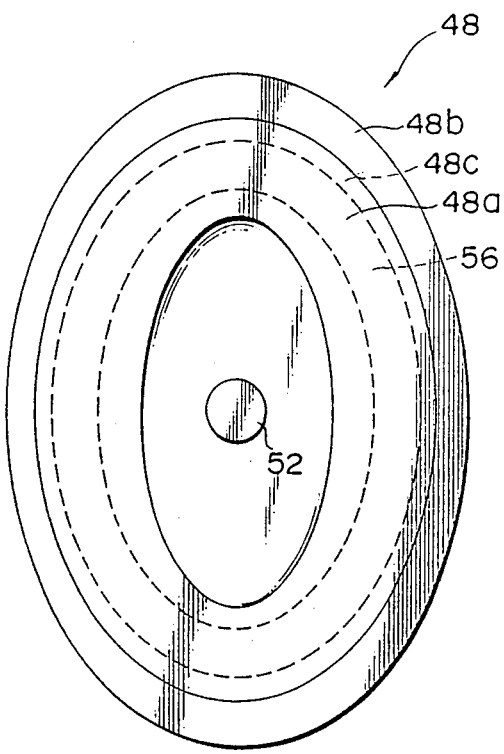

The process for manufacturing an FRP plate according to the present invention will now be described. The first embodiment of the process adopts the FW (Filament Winding) method as shown in FIG. 4. Reference numerals 40 in FIG. 4 denote roving coils from which rovings 41 consisting of reinforcing fibers are drawn off. The rovings 41 drawn from the three roving coils 40 are guided by a series of guide pulleys 42, passed through a matrix resin 46 (thermosetting resin) held in a resin tank 44, and, impregnated with the resin, are wound around a winding reel or a lower mold 48a which together with an upper mold 48b constitutes a mold 48 (FIGS. 5A and 5B). Although a plurality of guide pulleys are shown for each roving in FIG. 4, only three of them are indicated by the reference numeral 42 for the sake of simplicity. The mold 48 has a thick plate like shape having a substantially elliptical outer rim and is rotated about an axis 52 by a drive device (not shown). The mold 48 comprises the lower mold or the winding reel 48a and the upper mold 48b. A winding groove 50 or a groove having a rectangular cross section is formed on the outer circumference of the winding reel 48a and flanges 54 are formed at two ends thereof along the axial direction. The upper mold 48b is coupled to the outer circumference of the winding reel 48a. A projection 48c projecting inward from the upper mold 48b extends into the winding groove 50 so as to define therein a ring-shaped space 56 which has a cross section of the FRP plate to be manufactured (e.g., the cross section of the FRP plate 20a shown in FIG. 3A), and which extends along the entire circumference of the winding reel 48a. The substantially elliptical shape of the winding groove 50 is determined in accordance with the desired curvature of the FRP plate to be manufactured.

Figure 6:
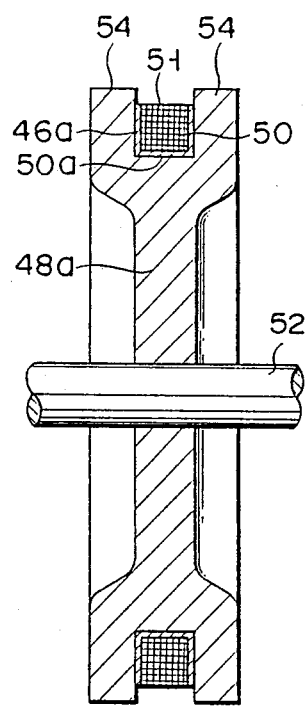
FIG. 6 is a sectional view showing a protective layer resin coated on a winding groove of a winding reel and an annular body formed in the winding groove.

When the FRP plate 20a as shown in FIG. 3A is to be manufactured using the apparatus as shown in FIG. 4, a resin 46a for forming a protective layer is obtained by adding calcium carbonate, aerosil or the like to the same resin used for the matrix resin 46, in order to chemically increase the viscosity. The resin 46a is applied on the inner surface of the winding groove 50 of the winding reel 48a, which has a cross section corresponding to the overall shape of the FRP plate 20a (FIG. 6). The viscosity of the resin 46a is increased for the following reason. When the resin for forming a protective layer applied on the inner surface of the winding groove 50 has a low viscosity, the resin is not securely adhered to the inner surface of the winding groove 50 if the ambient temperature is high. Then, the resin flows along the inner surface of the winding groove 50. The protective layer 28a may have a nonuniform thickness or may not be formed at all at certain portions. In order to eliminate flow of the resin, the viscosity of the resin is generally adjusted to a semicured state (B stage) or a state immediately prior to a cured state (C stage). The resin 46a for forming the protective layer (to be referred to as a protective layer resin for brevity hereinafter) is applied to only a small thickness on the inner surface of the winding groove 50, so as to prevent flow of the resin. The thickness of the resin is generally selected to fall within the range of 0.1 and 1.0 mm. If the resin still flows, the thickness of the resin is selected to fall within the range of 0.1 and 0.5 mm.

The winding reel 48a to which the protective layer resin is applied is mounted on the apparatus shown in FIG. 4 and is rotated by a suitable drive device (not shown). The rovings 41 drawn from the three roving coils 40 and impregnated with the resin 46 are wound within the protective layer resin in the winding groove 50.

Figure 7:
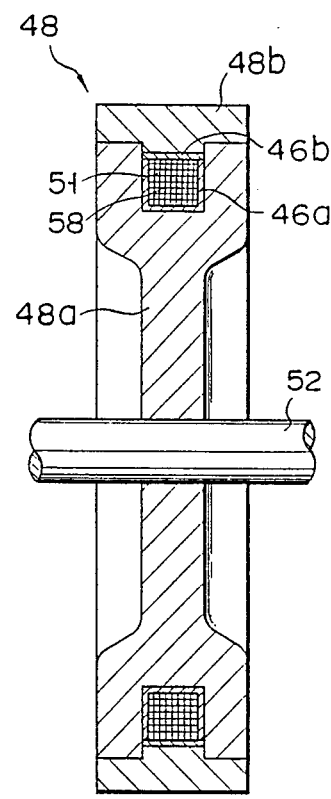
FIG. 7 is a sectional view of a mold obtained by coupling an upper mold to the winding reel as a lower mold shown in FIG. 6.

When the rovings 41 are wound to form an annular body 51 of a predetermined number of turns of reinforcing fibers in the winding groove 50, winding is interrupted and the upper mold 48b is coupled to the winding reel 48a as shown in FIG. 7. The upper mold 48b is arranged so as to be divided into a plurality of pieces along the outer perimeter of the winding reel 48a, thereby surrounding the entire perimeter of the winding reel 48a.

FIG. 7 is a view in which the upper mold 48b is coupled to the winding reel 48a as shown in FIG. 6. It is seen from FIG. 7 that a resin 46b as a protective layer is applied to the surface of the projection 48c of the upper mold 48b. When the mold 48 obtained by coupling the winding reel 48a and the upper mold 48b as shown in FIG. 7 is heated to cure the matrix resin 46 and the protective layer resins 46a and 46b, an FRP ring 58 is obtained in the ring-shaped space 56. The FRP ring 58 is reinforced at its outer perimeter by protective layers of the resins 46a and 46b, and has a cross section substantially the same as that of the FRP plate 20a.

The FRP ring 58 is taken out of the mold 48. In order to do this, the plurality of mold pieces constituting the upper mold 48b are removed first, and then the ring 58 is removed from the winding reel 48a. The winding reel 48a and upper mold 48b each consist of a plurality of pieces so as to allow easy removal of the ring 58 from the mold 48. The ring 58 removed from the mold 48 has a different size and shape than those of the FRP plate 20 as shown in FIG. 2. Accordingly, the ring 58 is cut at predetermined positions to provide an FRP plate having substantially the same shape as that of the FRP plate 20a. As is seen from the above description, the mold 48 and the winding groove 50 are designed to have a predetermined shape and size so as to allow formation of an FRP plate 20 as shown in FIG. 2 upon cutting the ring 58.

The above process for manufacturing an FRP plate is for a case where the FRP plate 20 has a protective layer 28a on its entire perimeter. However, if the protective layer resin is applied only on a bottom 50a of the winding groove 50, as shown in FIG. 6, and the resin is not applied to any other portion (including the inner circumferential surface of the projection 48c), an FRP plate 20b as shown in FIG. 3B can be obtained.

According to the process of the present invention as described above, heating of the mold 48 simultaneously cures the matrix resin 48 and the protective layer resins 46a and 46b. This simplifies the manufacturing process and lowers the manufacturing cost. Conventional processes involve preparation of an uncured FRP base, coating a protective layer resin on at least a part the perimeter of the base, and heating the base with the resin for curing the resin. However, the process of the present invention does not involve such complex procedures.

Figure 8:
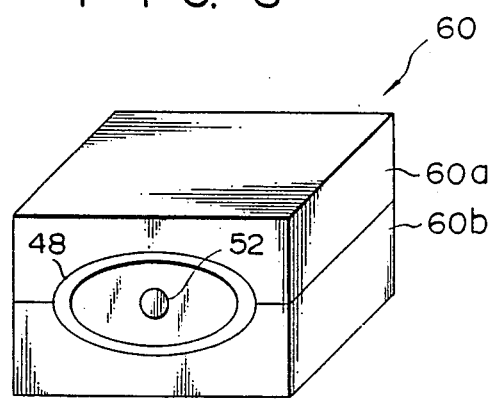
FIG. 8 is a perspective view showing a mold for holding the winding reel on which a roving is wound and for heating and curing the matrix resin and the protective layer resin.

In the process of the present invention as described above, the upper mold 48a consisting of a plurality of mold pieces is coupled to the outer perimeter of the winding reel 48a. However, this type of mold need not always be used. For example, when a winding reel 48a with the annular body 51 formed therein is inserted in a mold 60 as shown in FIG. 8 and the mold 60 is heated, an FRP ring similar to that shown in FIG. 7 is obtained. The mold 60 consists of an upper mold 60a and a lower mold 60b. Whether to apply a protective layer resin on the inner surface of the upper mold 60a and the lower mold 60b is determined in accordance with the intended application of the resultant FRP plate. A procedure for obtaining an FRP plate 20a as shown in FIG. 3A from the FRP ring 50 is as described above.

A procedure for obtaining the FRP plates 20c and 20d having a screen 30 as shown in FIGS. 3C and 3D is substantially the same as that described with reference to FIG. 4. However, the step of applying a protective layer resin on the inner surface of the winding groove 50 of the winding reel 48a and the distal end of the projection 48c of the upper mold 48b is eliminated. Instead, after placing a screen 30 on the inner surface of the winding groove 50, an annular body 51 as described with reference to FIG. 6 is formed inside the screen 30 and, the surface of the annular body 51 exposed to the external air is wrapped with an overlapping portion of the screen 30. Then, the winding reel 48a and the upper mold 48b are coupled to obtain the mold 48 and then the mold 48 is heated. In this case, while the temperature of the mold 48 is still low, part of the matrix resin has a low viscosity and flows to the outside through the screen. As the mold temperature rises, all the resin at both sides of the screen 30 is cured. Thus, the protective layer resin need not be applied to the winding reel 48a and the lower mold 48b of the mold 48, further simplifying the process for manufacturing an FRP plate.

Figure 9A:
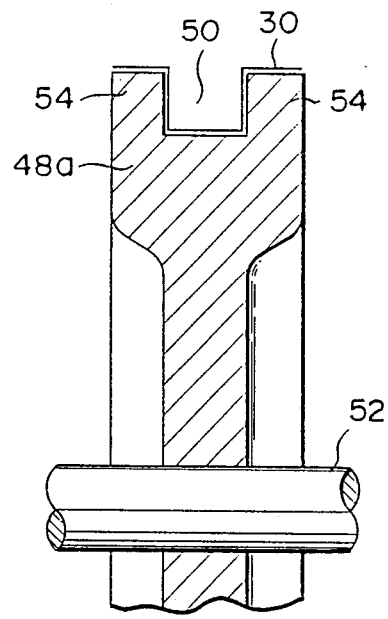
FIG. 9A is a view wherein a screen is arranged in a winding groove of a winding reel.
Figure 9B:
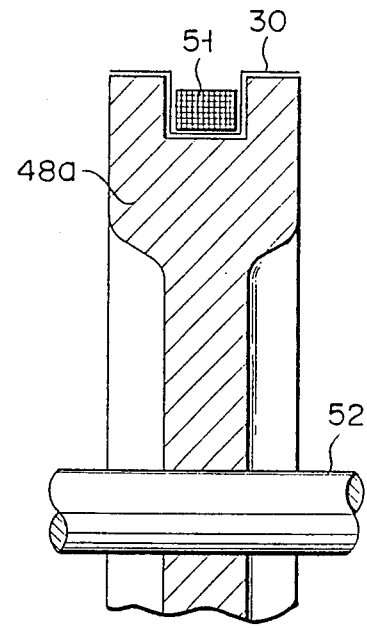
FIG. 9B is a view wherein a roving is wound in a winding groove shown in FIG. 9A.
Figure 9C:
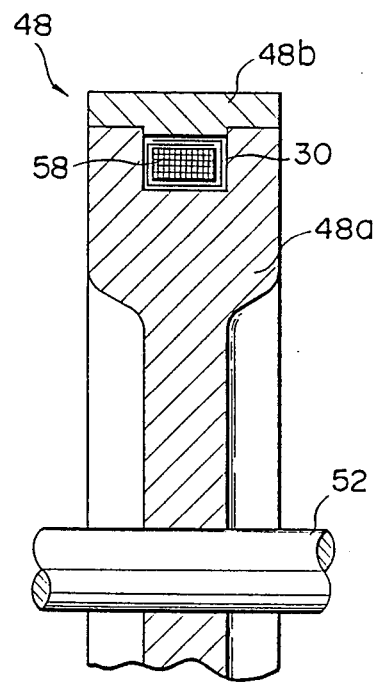
FIG. 9C is a sectional view wherein a screen is placed over the roving and an upper mold is coupled to the winding reel.

FIG. 9A shows a state wherein a screen 30 is arranged along the inner surface of the winding groove 50 of the winding reel 48a, and portions of the screen 30 extending outside the winding groove 50 are placed on the flanges 54. FIG. 9B shows a state wherein an annular body 51 is formed inside the screen 30. FIG. 9C shows a state wherein the extending portions of the screen 30 are superposed on the outer surface of the annular body 51 shown in FIG. 9B. After the annular body 51 is wrapped with the screen 30 in this manner, the mold 48 is formed by the winding reel 48a and the upper mold 48b. When the mold 48 is heated, a protective layer is formed outside the screen 30, as has been described earlier. The subsequent procedure for obtaining an FRP plate is the same as the screen 30 is not used.

The screen 30 can be a thin sheet of a woven or non-woven cloth of synthetic resin fibers. Such a sheet must not allow passage of the reinforcing fibers therethrough, and must allow passage only of the resin.

The screen 30 can be a relatively thick material such as a glass mat (a chip dost, land mat, surface mat or cloth), which allows impregnation with a resin. Such a screen 30 is arranged at a predetermined position in the mold 48, and the annular body 51 is placed in the mold 48. When the annular body 51 is compressed and heated by the mold 48, the resin can be cured in a state wherein parts of the resin impregnating the screen and the matrix resin have flowed outside the screen. Then, a relatively thick protective layer can be formed on the FRP base 26.

The plates shown in FIGS. 3C and 3D both have a screen 30. However, the plates in FIGS. 3C and 3D are different in that the plate in FIG. 3C has a single-layer screen 30 while the plate in FIG. 3D has an overlapping portion at the connecting portion of the screen 30.

What is claimed is:

1. A leaf spring, comprising a plurality of fiber reinforced plastic plates, said plastic plates each being flexible spring members and each having spring characteristics, and means for coupling said plates together to form a leaf spring, each of said plastic plates comprising:

a plurality of reinforcing fibers positioned substantially parallel to each other and throughout the length of said plastic plate and a thermosetting resin body having the reinforcing fibers embedded therein, the thermosetting resin body consisting of a matrix resin which is cured to provide a fiber reinforced plastic body having the reinforcing fibers embedded therein, said fiber reinforced plastic body having an outer surface at least a portion of which is in compression when said spring member is flexed; and a protective layer, formed of a cured resin, said protective layer being fixed to at least a part of the outer surface of said fiber reinforced plastic body which is in compression when said spring member is flexed.

2. The spring of claim 1, wherein a liquid-permeable screen is interposed between said protective layer and said fiber reinforced plastic base.

3. The spring member of claim 2, wherein said matrix resin and said resin which is cured to form said protective layer are both the same thermosetting resin.

4. The spring member of claim 3, wherein said protective layer forms a peripheral coating layer around four sides of said plate.

5. The spring member of claim 2, wherein said protective layer forms a peripheral coating layer around four sides of said plate.

6. The spring member of claim 1, wherein said matrix resin and said resin which is cured to form said protective layer are both the same thermosetting resin.

7. The spring member of claim 6, wherein said protective layer forms a peripheral coating layer around four sides of said plate.

8. The spring member of claim 1, wherein said protective layer forms a peripheral coating layer around four sides of said plate.

9. The spring member of claim 1, wherein said plate in cross section has two long sides and two short sides and said protective layer covers one of said long sides.

10. The spring of claim 1 which is an FRP leaf spring for an automobile.

* * * * *